(12) United States Patent
Mitani et al.

(10) Patent No.: US 12,054,269 B2
(45) Date of Patent: Aug. 6, 2024

(54) POWER SUPPLY SYSTEM OF AIRCRAFT

(71) Applicant: HONDA MOTOR CO., LTD., Tokyo (JP)

(72) Inventors: Manabu Mitani, Wako (JP); Masataka Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/173,996

(22) Filed: Feb. 24, 2023

(65) Prior Publication Data

US 2023/0271711 A1    Aug. 31, 2023

(30) Foreign Application Priority Data

Feb. 28, 2022    (JP) .................................. 2022-029189

(51) Int. Cl.
*B64D 27/24*    (2024.01)
(52) U.S. Cl.
CPC .......... *B64D 27/24* (2013.01); *B64D 2221/00* (2013.01)
(58) Field of Classification Search
CPC ....... B64D 27/24; B64D 2221/00; H02J 7/34; H02J 1/14; H02J 2310/44
See application file for complete search history.

(56) References Cited

U.S. PATENT DOCUMENTS

| | | | | |
|---|---|---|---|---|
| 4,967,096 A | * | 10/1990 | Diemer .................. | F02N 11/04 307/45 |
| 11,091,107 B2 | * | 8/2021 | Maekawa ............... | H02J 7/342 |
| 2019/0009920 A1 | * | 1/2019 | Armstrong ............. | H02J 3/007 |
| 2020/0207296 A1 | * | 7/2020 | Maekawa ............... | B62D 5/046 |
| 2022/0355944 A1 | * | 11/2022 | Biaujaud ............... | B64D 27/02 |

FOREIGN PATENT DOCUMENTS

WO    2021/089948 A1    5/2021

* cited by examiner

*Primary Examiner* — Jared Fureman
*Assistant Examiner* — Michael J Warmflash
(74) *Attorney, Agent, or Firm* — Rankin, Hill & Clark LLP (57) ABSTRACT

In a power supply system of an aircraft, when electric power is supplied from a power generation unit to a drive unit, the electric power is supplied from the power generation unit to the drive unit via a first power transmission path, and a voltage is applied to a second power transmission path by a fault detection circuit in a state in which the power generation unit and the drive unit are disconnected from the second power transmission path, and when the power generation unit is started, electric power of the fault detection circuit is supplied to the power generation unit in a state in which the power generation unit is connected to the second power transmission path.

4 Claims, 11 Drawing Sheets

POWER SUPPLY SYSTEM OF AIRCRAFT

CROSS-REFERENCE TO RELATED APPLICATIONS

This application is based upon and claims the benefit of priority from Japanese Patent Application No. 2022-029189 filed on Feb. 28, 2022, the contents of which are incorporated herein by reference.

BACKGROUND OF THE INVENTION

Field of the Invention

The present invention relates to a power supply system of an aircraft.

Description of the Related Art

WO 2021/089948 A1 discloses a hybrid propulsion architecture for an electric aircraft. The electric aircraft includes an electric motor that drives a propeller. The electric motor is operated by electric power supplied from a power generation device or electric power supplied from a battery. The power generation device includes a gas turbine, a generator, and a converter. A diode that prevents current from flowing from the battery to the generator is provided between the battery and the generator.

SUMMARY OF THE INVENTION

In the technique disclosed in WO 2021/089948 A1, no consideration is given to supplying electric power to the power generation device. Since the capacitor of the converter needs to be charged before the generator is driven, electric power needs to be supplied to the converter. Further, in order to start the gas turbine by the generator, it is necessary to supply electric power to the generator.

It is conceivable to supply electric power to the power generation device from the battery for supplying electric power to the electric motor. In this case, a switching element or the like needs to be provided in parallel with the diode. Alternatively, it is conceivable to provide a battery for supplying electric power to the power generation device, separately from the battery for supplying electric power to the electric motor. However, in either case, there is a problem in that the number of components increases.

An object of the present invention is to solve the above-mentioned problem.

According to an aspect of the present invention, there is provided a power supply system of an aircraft, the power supply system comprising: a first power transmission path configured to supply electric power from at least one power generation device to at least one load device; a second power transmission path configured to supply electric power from the at least one power generation device to the at least one load device; and a fault detection circuit configured to apply a voltage to the second power transmission path, wherein when the electric power is supplied from the power generation device to the load device, the electric power is supplied from the power generation device to the load device via the first power transmission path, and a voltage is applied to the second power transmission path by the fault detection circuit in a state in which the power generation device and the load device are disconnected from the second power transmission path, and when the power generation device is started, electric power of the fault detection circuit is supplied to the power generation device in a state in which the power generation device is connected to the second power transmission path.

According to the present invention, it is possible to supply electric power to the power generation device while suppressing an increase in the number of components.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Configuration of Aircraft]

Figure 1:
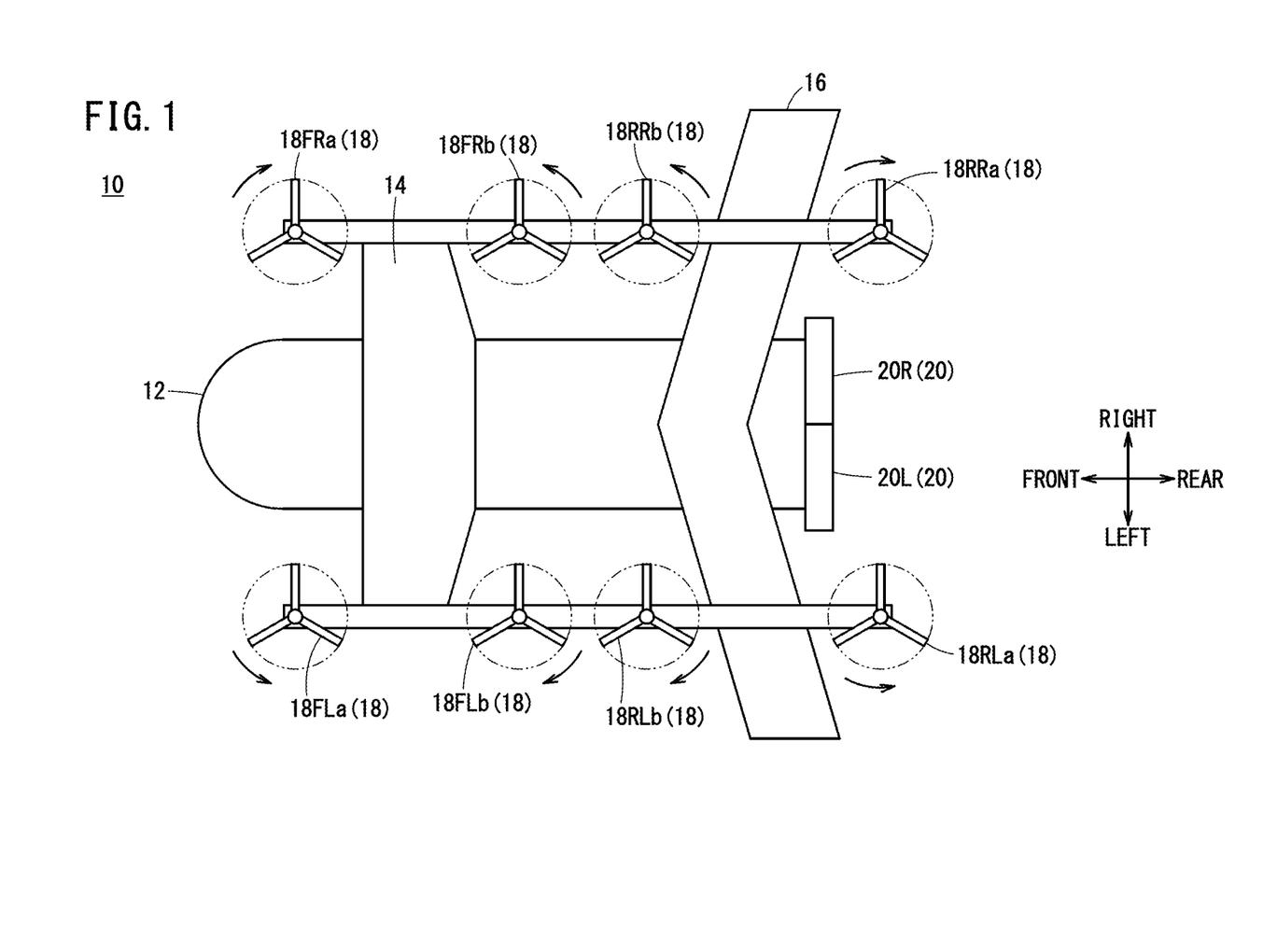
FIG. 1 is a schematic diagram of an aircraft.

FIG. 1 is a schematic diagram of an aircraft 10. The aircraft 10 of the present embodiment is an electric vertical take-off and landing aircraft (eVTOL aircraft). In the aircraft 10, rotors are driven by electric motors. The aircraft 10 generates vertical thrust and horizontal thrust by the rotors. Further, the aircraft 10 is a hybrid aircraft. The aircraft 10 includes a generator and a battery as power sources of the electric motor. In the aircraft 10, electric power generated by the generator is supplied to the electric motor. When the electric power generated by the generator is insufficient with respect to the required electric power, the electric power stored in the battery is supplied to the electric motor.

The aircraft 10 includes a fuselage 12. The fuselage 12 is provided with a cockpit, a cabin, and the like. A pilot rides in the cockpit and controls the aircraft 10. Passengers and the like ride in the cabin. The aircraft 10 may be automatically controlled.

The aircraft 10 includes a front wing 14 and a rear wing 16. When the aircraft 10 moves forward, lift is generated in each of the front wing 14 and the rear wing 16.

The aircraft 10 includes eight VTOL rotors 18. The eight VTOL rotors 18 are a rotor 18FLa, a rotor 18FLb, a rotor 18RLa, a rotor 18RLb, a rotor 18FRa, a rotor 18FRb, a rotor 18RRa, and a rotor 18RRb.

The rotation shaft of each VTOL rotor 18 extends in the up-down direction. The thrust of each VTOL rotor 18 is controlled by adjusting the rotational speed of the rotor, and the pitch angle of the blades. Each VTOL rotor 18 is used during vertical take-off, during transition from vertical take-off to cruising, during transition from cruising to vertical landing, during vertical landing, during hovering, and the like. Further, each VTOL rotor 18 is used during attitude control.

Lift thrust is generated by controlling the thrust of each VTOL rotor 18. The lift thrust indicates thrust in the vertical direction. The thrust of each VTOL rotor 18 is controlled to cause a roll moment, a pitch moment, and a yaw moment to act on the fuselage 12.

The aircraft 10 includes two cruise rotors 20. The two cruise rotors 20 are a rotor 20L and a rotor 20R. The rotor 20L and the rotor 20R are attached to the rear portion of the fuselage 12.

The rotation shaft of each cruise rotor 20 extends in the front-rear direction. The thrust of each cruise rotor 20 is controlled by adjusting the rotational speed of the rotor, and the pitch angle of the blades. Each cruise rotor 20 is used during transition from vertical take-off to cruising, during cruising, during transition from cruising to vertical landing, and the like.

Cruise thrust is generated by controlling the thrust of each cruise rotor 20. The cruise thrust indicates thrust in the horizontal direction.

[Configuration of Power Supply System]

Figure 2:
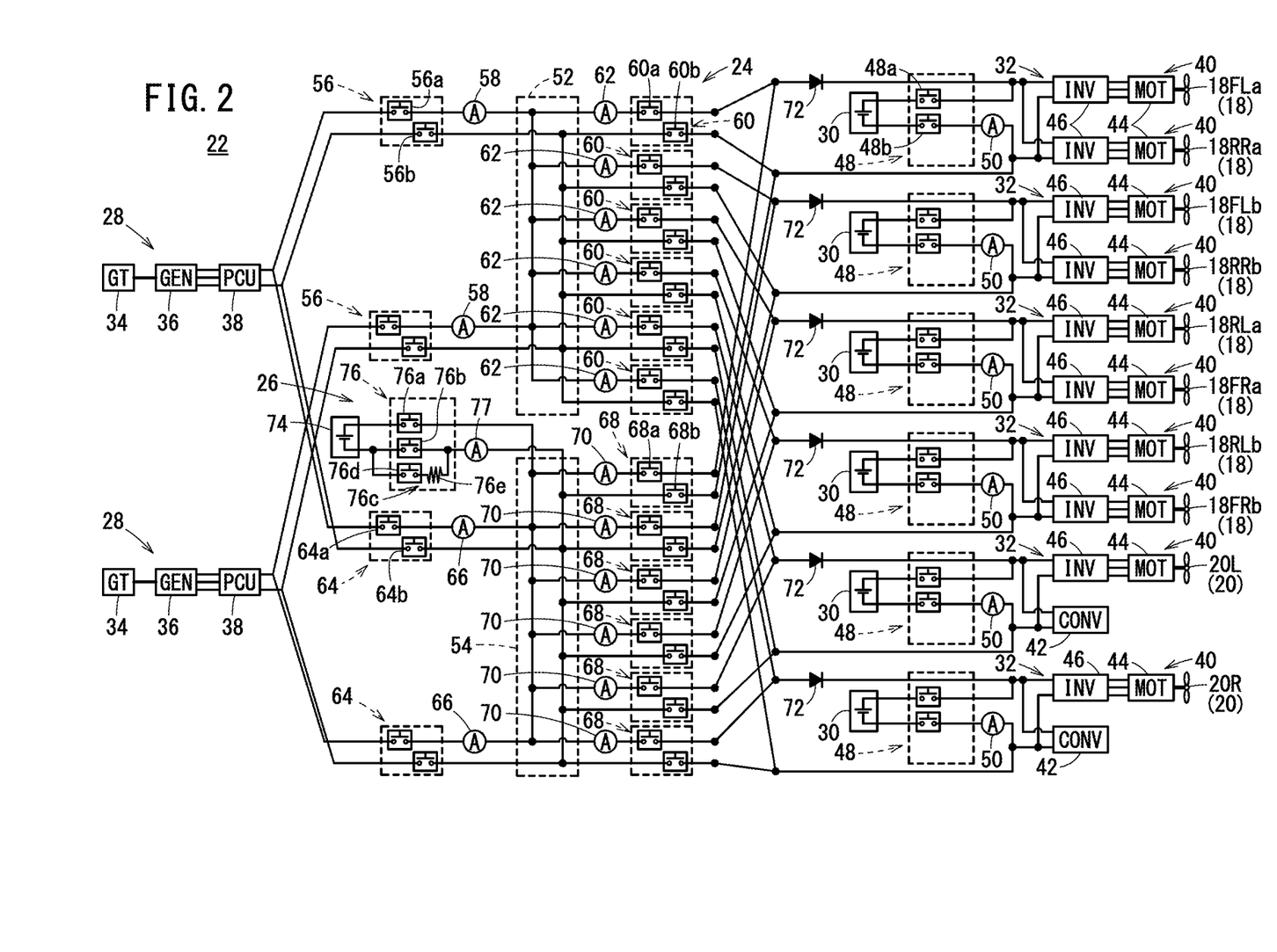
FIG. 2 is a schematic diagram showing a configuration of a power supply system.

FIG. 2 is a schematic diagram showing a configuration of a power supply system 22.

The power supply system 22 includes a power supply circuit 24, a fault detection circuit 26, two power generation units 28, and six batteries 30.

The power supply circuit 24 supplies electric power from each of the two power generation units 28 to each of six drive modules 32. Each drive module 32 is operated by electric power generated by each power generation unit 28. Electric power stored in each battery 30 is supplied to each drive module 32 separately from electric power generated by each power generation unit 28. Each drive module 32 is operated by the electric power supplied from each battery 30.

Each power generation unit 28 includes a gas turbine 34, a generator 36, and a power control unit (hereinafter referred to as PCU) 38. The gas turbine 34 drives the generator 36. As a result, the generator 36 generates electric power. The PCU 38 converts the AC power generated by the generator 36 into DC power and outputs the DC power to the power supply circuit 24. In other words, the PCU 38 functions as an AC-DC converter, and the PCU 38 includes a capacitor. Each power generation unit 28 corresponds to a power generation device of the present invention.

When the gas turbine 34 is started, the PCU 38 converts the DC power supplied from the power supply circuit 24 into AC power, and outputs the AC power to the generator 36. The generator 36 is operated by the electric power input from the PCU 38, and the generator 36 drives the gas turbine 34.

Among the six drive modules 32, four drive modules 32 each include two drive units 40. The other two drive modules 32 each include one drive unit 40 and one converter 42. Each VTOL rotor 18 or each cruise rotor 20 is driven by the drive unit 40.

Each drive unit 40 includes an electric motor 44 and an inverter 46. The electric motor 44 is a three phase motor. Each VTOL rotor 18 is coupled to the output shaft of each electric motor 44. Each cruise rotor 20 is coupled to the output shaft of each electric motor 44. The inverter 46 converts the DC power supplied from the power supply circuit 24 into three phase AC power, and outputs the three phase AC power to the electric motor 44. The inverter 46 includes a capacitor. Each drive unit 40 corresponds to a load device of the present invention.

The converter 42 steps down the voltage of the DC power supplied from the power supply circuit 24 and outputs the stepped-down power to a device operated by DC power. The device operated by DC power is, for example, a fan that cools the PCU 38, the inverter 46, and the like. The device operated by DC power is, for example, an electronic control unit (ECU) that controls the gas turbine 34, the PCU 38, the inverter 46, the power supply circuit 24, and the like.

The battery 30 is connected to each drive module 32. A contactor unit 48 is provided between each battery 30 and each drive module 32. Each contactor unit 48 includes a contactor 48a and a contactor 48b. The contactor 48a is provided on a positive line that connects each battery 30 and each drive module 32. The contactor 48b is provided on a negative line that connects each battery 30 and each drive module 32. A current sensor 50 is provided on the negative line that connects each battery 30 and each drive module 32.

Each contactor unit 48 switches between a conduction state and an interruption state, between each battery 30 and each drive module 32. The conduction state is a state in which electricity flows. The interruption state is a state in which electricity does not flow. Each contactor unit 48 may include only one of the contactor 48a or the contactor 48b.

The power supply circuit 24 includes a first power transmission path 52 and a second power transmission path 54. The first power transmission path 52 is configured to supply electric power from each power generation unit 28 to each drive module 32. The second power transmission path 54 is configured to supply electric power from each power generation unit 28 to each drive module 32.

The power supply circuit 24 includes two contactor units 56. Each contactor unit 56 is provided between each power generation unit 28 and the first power transmission path 52. Each contactor unit 56 includes a contactor 56a and a contactor 56b. Each contactor 56a is provided on a positive line that connects each power generation unit 28 and the first power transmission path 52. Each contactor 56b is provided on a negative line that connects each power generation unit 28 and the first power transmission path 52. A current sensor 58 is provided between each contactor 56a and the first power transmission path 52.

Each contactor unit 56 switches between the conduction state and the interruption state, between each power generation unit 28 and the first power transmission path 52.

The power supply circuit 24 includes six contactor units 60. Each contactor unit 60 is provided between each drive module 32 and the first power transmission path 52. Each contactor unit 60 includes a contactor 60a and a contactor 60b. Each contactor 60a is provided on a positive line that connects each drive module 32 and the first power transmission path 52. Each contactor 60b is provided on a negative line that connects each drive module 32 and the first power transmission path 52. A current sensor 62 is provided between each contactor 60a and the first power transmission path 52.

Each contactor unit 60 switches between the conduction state and the interruption state, between each drive module 32 and the first power transmission path 52.

The power supply circuit 24 includes two contactor units 64. Each contactor unit 64 is provided between each power generation unit 28 and the second power transmission path 54. Each contactor unit 64 includes a contactor 64a and a contactor 64b. Each contactor 64a is provided on a positive line that connects each power generation unit 28 and the second power transmission path 54. Each contactor 64b is provided on a negative line that connects each power generation unit 28 and the second power transmission path 54. A current sensor 66 is provided between each contactor 64a and the second power transmission path 54.

Each contactor unit 64 switches between the conduction state and the interruption state, between each power generation unit 28 and the second power transmission path 54.

The power supply circuit 24 includes six contactor units 68. Each contactor unit 68 is provided between each drive module 32 and the second power transmission path 54.

Each contactor unit 68 switches between the conduction state and the interruption state, between each drive module 32 and the second power transmission path 54. Each contactor unit 68 may include only one of a contactor 68a or a contactor 68b.

A diode 72 is provided between each battery 30 and a contact point connected to both the first power transmission path 52 and the second power transmission path 54. Each diode 72 is provided on a positive line that connects each battery 30 and the contact point. An anode of each diode 72 is connected to the contact point, and a cathode thereof is connected to each battery 30. The diode 72 allows electric power to be supplied from the first power transmission path 52 and the second power transmission path 54 to each battery 30. The diode 72 prevents electric power from being supplied from each battery 30 to the first power transmission path 52 and the second power transmission path 54.

Thus, each battery 30 is charged with the electric power supplied from the power generation unit 28. In addition, when the first power transmission path 52 is short-circuited or when the second power transmission path 54 is short-circuited, the electric power of each battery 30 is prevented from flowing to the first power transmission path 52 or the second power transmission path 54. As a result, even when the first power transmission path 52 is short-circuited or the second power transmission path 54 is short-circuited, electric power can be supplied from each battery 30 to the drive unit 40 and the converter 42 in each drive module 32.

The fault detection circuit 26 is connected to the second power transmission path 54. The fault detection circuit 26 includes a battery 74 and a contactor unit 76. The contactor unit 76 is provided between the battery 74 and the second power transmission path 54. The contactor unit 76 includes a contactor 76a, a contactor 76b, and a precharge circuit 76c. The contactor 76a is provided on a positive line that connects the battery 74 and the second power transmission path 54. The contactor 76b is provided on a negative line that connects the battery 74 and the second power transmission path 54. A current sensor 77 is provided between the contactor 76b and the second power transmission path 54. The precharge circuit 76c is provided in parallel with the contactor 76b. The precharge circuit 76c includes a contactor 76d and a resistor 76e.

The contactor unit 76 switches between the conduction state and the interruption state, between the battery 74 and the second power transmission path 54. In the conduction state, the contactor unit 76 further switches between a state in which electricity flows through the precharge circuit 76c and a state in which electricity flows without passing through the precharge circuit 76c.

The contactor unit 76 may include only the contactor 76b and the precharge circuit 76c. The precharge circuit 76c may be provided in parallel with the contactor 76a. In this case, the contactor unit 76 may include only the contactor 76a and the precharge circuit 76c.

[Operation of Contactor Unit]

FIGS. 3 to 8 are schematic diagrams of the power supply system 22. FIGS. 3 to 8 schematically show the circuit configuration of the power supply circuit 24 between one power generation unit 28 and one drive module 32. Hereinafter, the operation of each contactor unit will be described with reference to FIGS. 3 to 8. In the case where the number of the power generation units 28 is two or more and the number of the drive modules 32 is two or more, although the number of the contactor units is increased, the operation of each contactor unit is the same as the operation described below.

(Case where Capacitor is Precharged)

Figure 3:
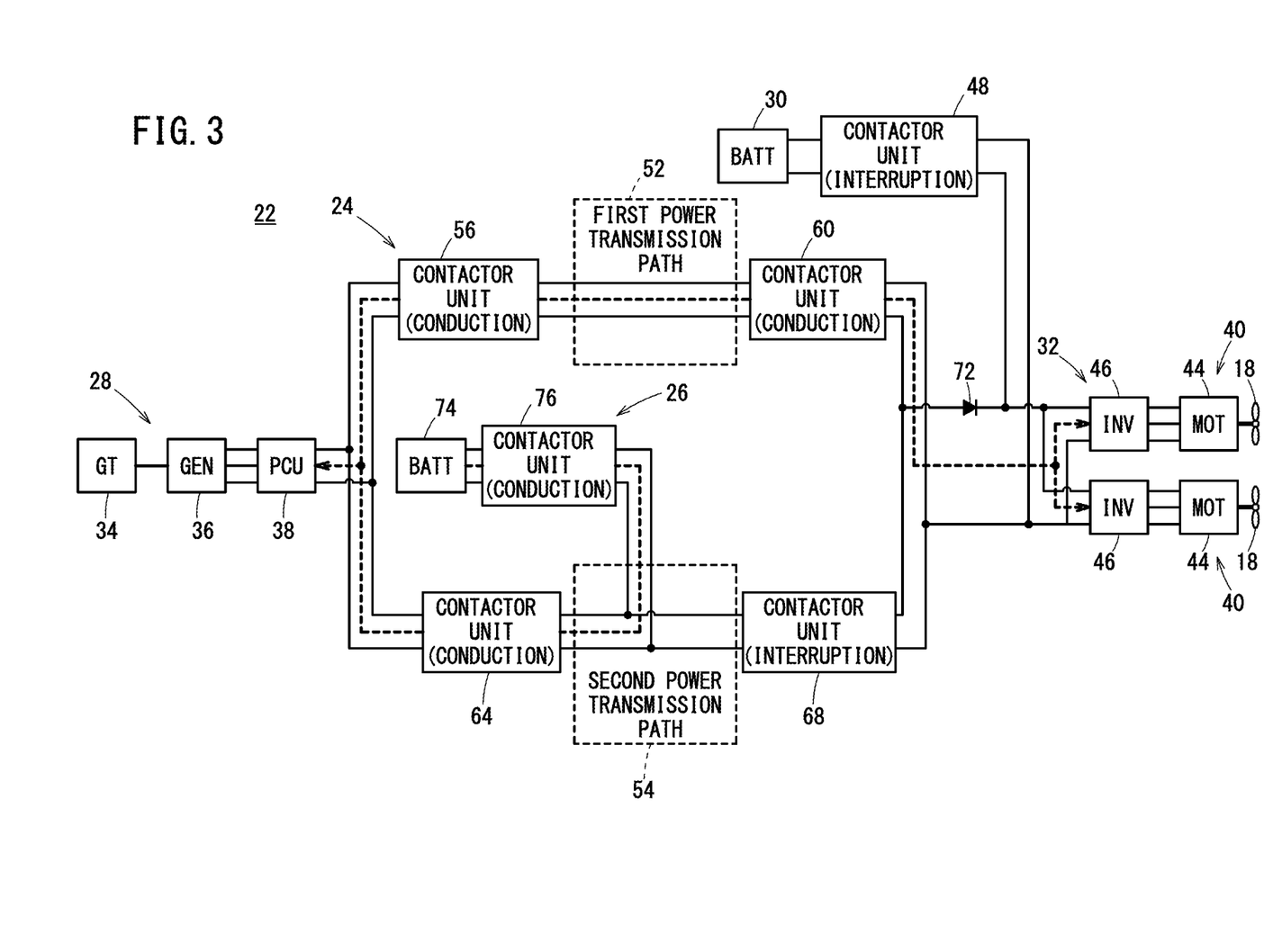
FIG. 3 is a schematic diagram of a power supply circuit.

When the capacitor of the PCU 38 and the capacitor of the inverter 46 are pre-charged, the power supply system 22 brings each of the contactor unit 56, the contactor unit 60, the contactor unit 64, and the contactor unit 76 into the conduction state as shown in FIG. 3. The contactor unit 76 is brought into a state in which electricity flows through the precharge circuit 76c (FIG. 2). Further, the power supply system 22 brings each of the contactor unit 48 and the contactor unit 68 into the interruption state.

As a result, electric power is supplied from the battery 74 to the PCU 38 and the inverter 46. The capacitor of the PCU 38 and the capacitor of the inverter 46 are charged with the electric power supplied from the battery 74.

(Case where Gas Turbine is Started)

Figure 4:
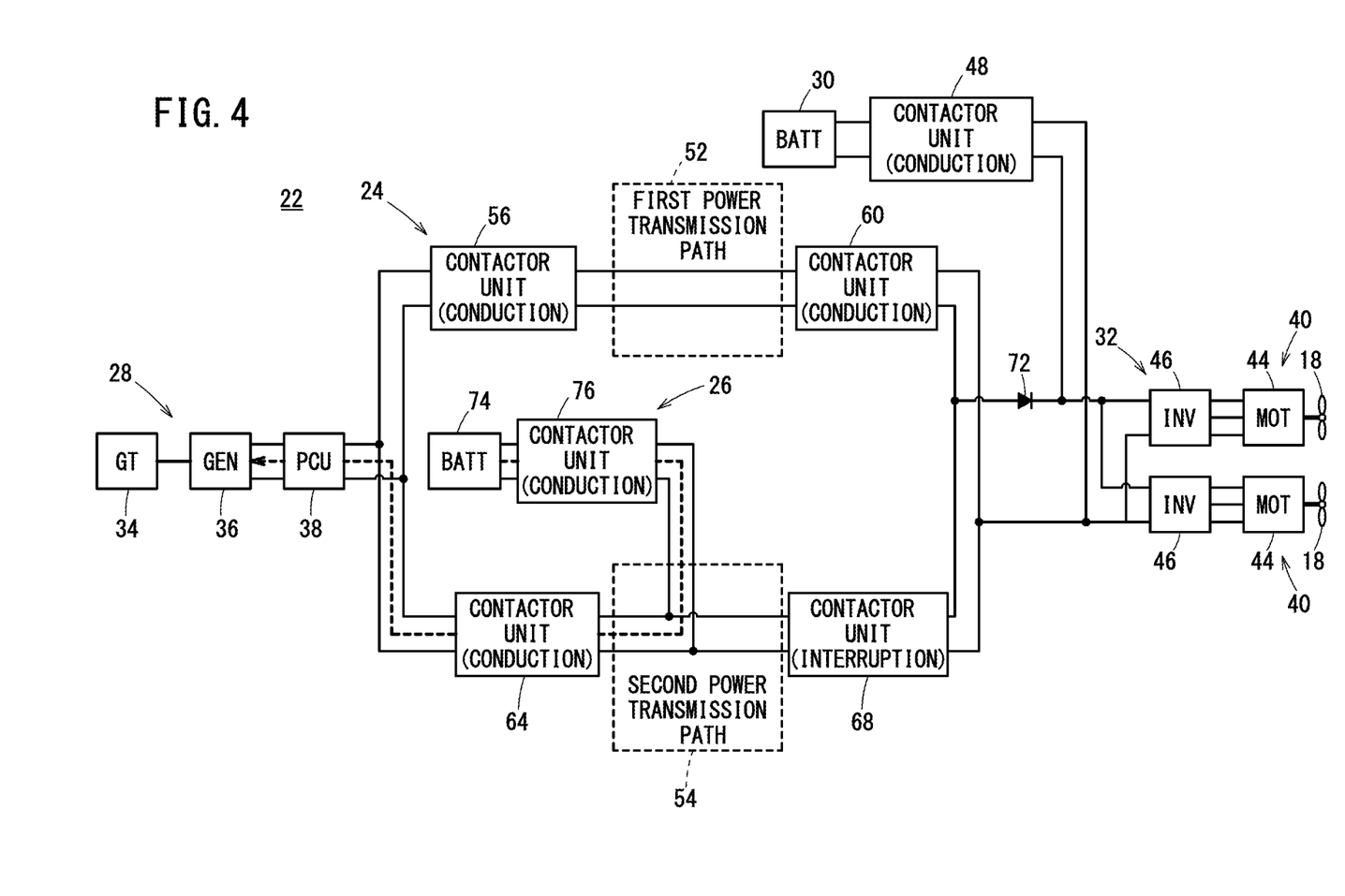
FIG. 4 is a schematic diagram of the power supply circuit.

When the gas turbine 34 is started, the power supply system 22 brings each of the contactor unit 48, the contactor unit 56, the contactor unit 60, the contactor unit 64, and the contactor unit 76 into the conduction state as shown in FIG. 4. The contactor unit 76 is brought into a state in which electricity flows without passing through the precharge circuit 76c (FIG. 2). Further, the power supply system 22 brings the contactor unit 68 into the interruption state.

As a result, electric power is supplied from the battery 74 to the generator 36. The generator 36 is operated by the electric power supplied from the battery 74, and the generator 36 drives the gas turbine 34.

(Case where Electric Motor is Operated (1))

Figure 5:
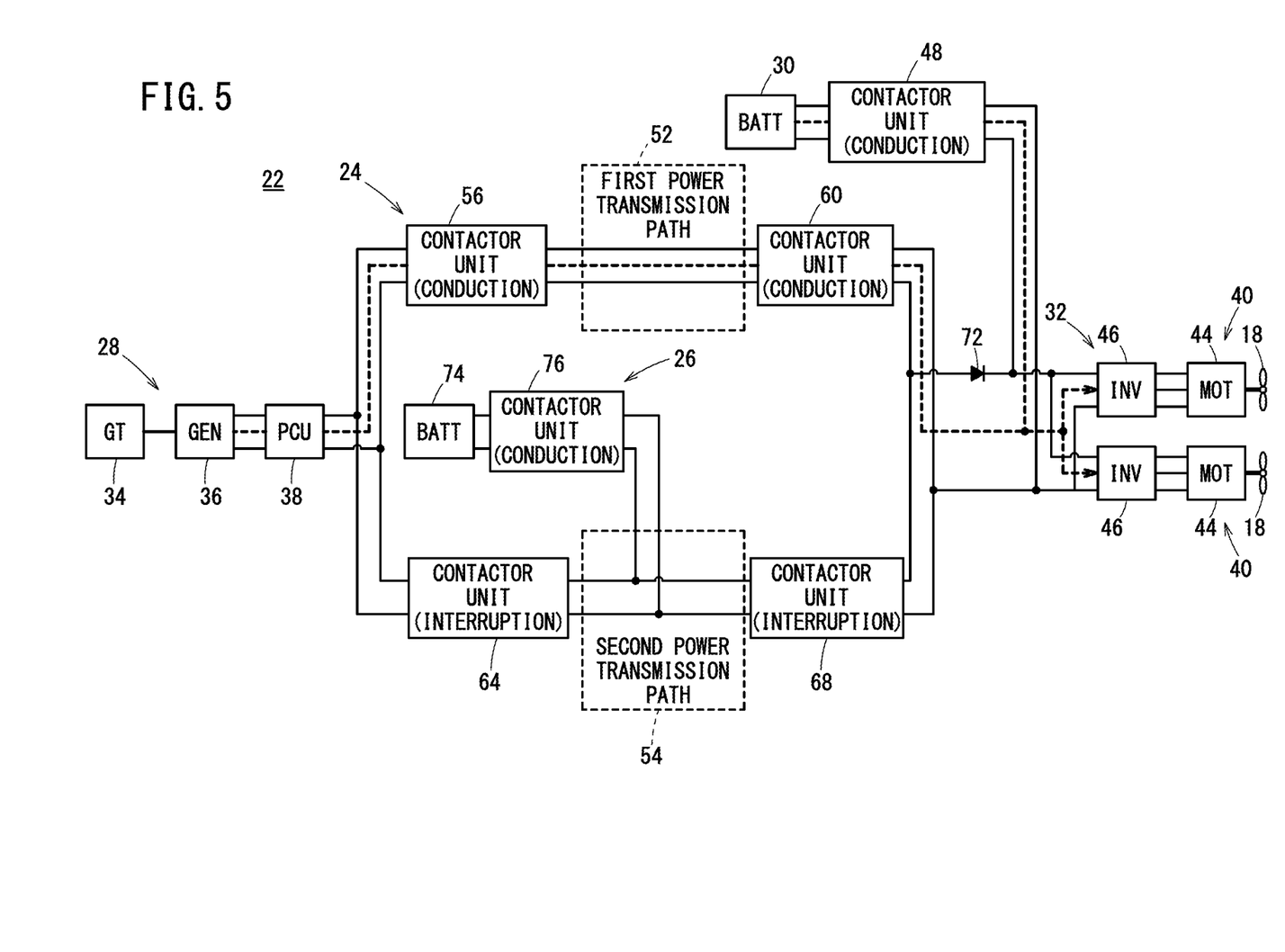
FIG. 5 is a schematic diagram of the power supply circuit.

When the electric motor 44 is operated, the power supply system 22 brings each of the contactor unit 48, the contactor unit 56, the contactor unit 60, and the contactor unit 76 into the conduction state as shown in FIG. 5. The contactor unit 76 is brought into a state in which electricity flows through the precharge circuit 76c (FIG. 2). Further, the power supply system 22 brings each of the contactor unit 64 and the contactor unit 68 into the interruption state.

As a result, electric power is supplied from the generator 36 to each electric motor 44 via the first power transmission path 52. Further, electric power is supplied from the battery 30 to each electric motor 44. Each electric motor 44 is operated by the electric power supplied from the generator 36 and the battery 30, and each electric motor 44 drives each VTOL rotor 18.

A voltage is applied to the second power transmission path 54 by the fault detection circuit 26. However, since the contactor unit 64 and the contactor unit 68 are in the interruption state, no current flows through the second power transmission path 54.

(Case where Second Power Transmission Path is Short-Circuited)

Figure 6:
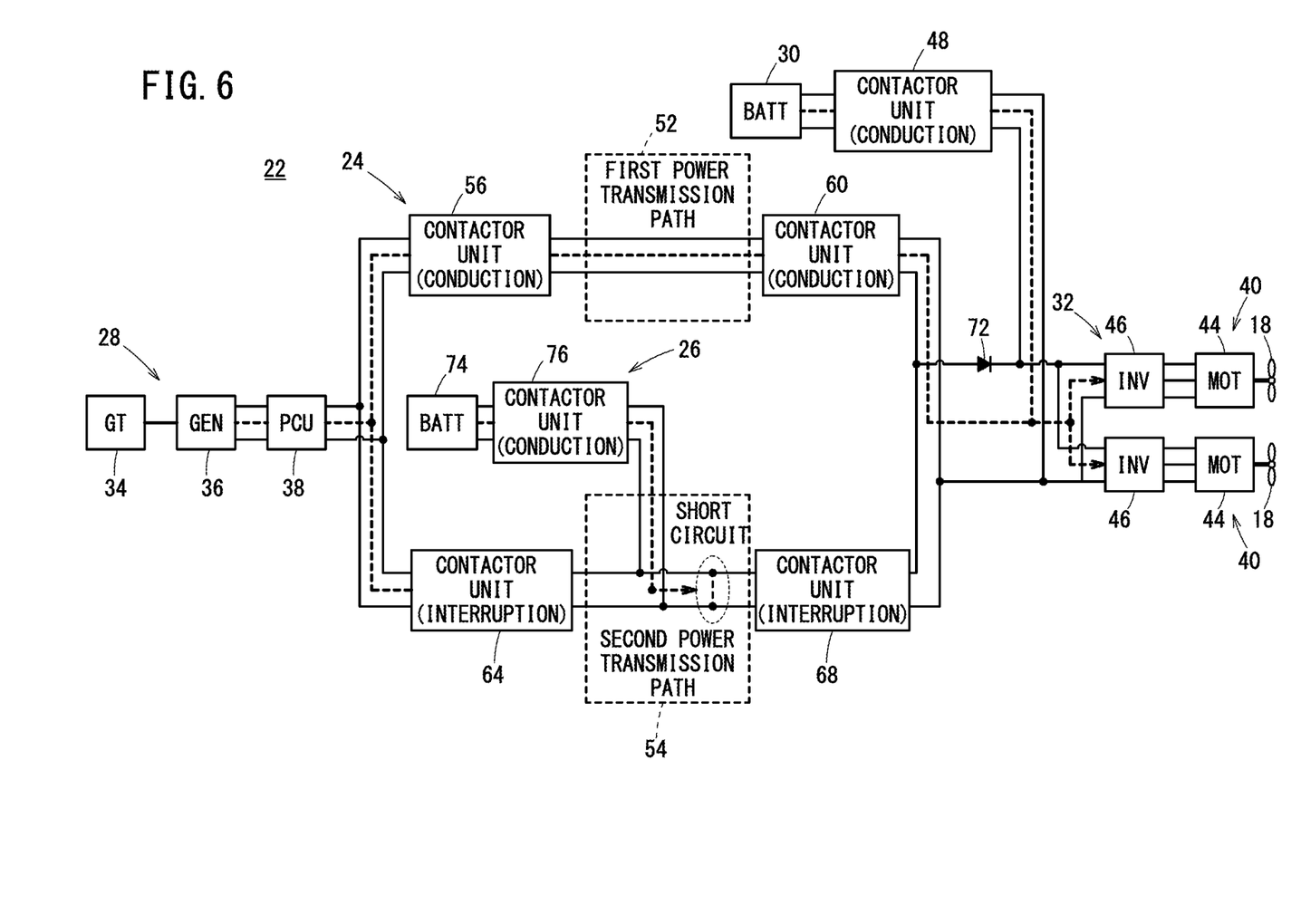
FIG. 6 is a schematic diagram of the power supply circuit.

A voltage is applied to the second power transmission path 54 which is not in use. Therefore, when the second power transmission path 54 is short-circuited as shown in FIG. 6, current flows between the fault detection circuit 26 and a location where the short circuit has occurred. Whether the current has flowed can be determined based on a current value detected by the current sensor 77 (FIG. 2). As a result, even when the second power transmission path 54 is not in use, a short circuit of the second power transmission path 54 can be detected.

Since the contactor unit 64 and the contactor unit 68 are in the interruption state, it is possible to suppress the influence of the short circuit of the second power transmission path 54 on the other portions of the power supply circuit 24.

(Case where First Power Transmission Path is Short-Circuited)

When the first power transmission path 52 is short-circuited, an overcurrent flows between the power generation unit 28 and the first power transmission path 52. Whether the overcurrent has flowed can be determined based on a current value detected by the current sensor 58 (FIG. 2). When the first power transmission path 52 is short-circuited, the gas turbine 34 is stopped and the generator 36 is stopped by a protection device (not shown).

Figure 7:
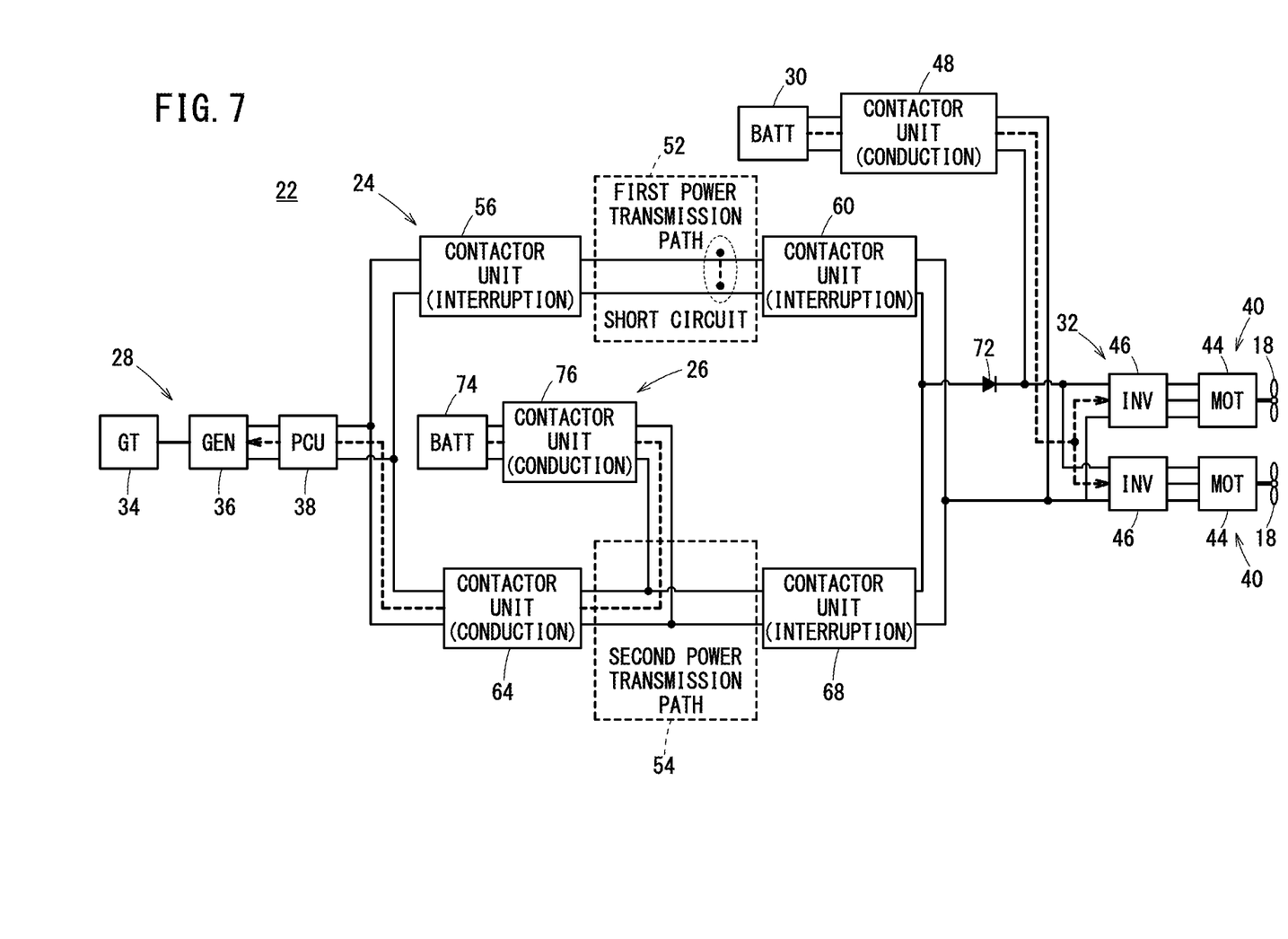
FIG. 7 is a schematic diagram of the power supply circuit.

When the first power transmission path 52 is short-circuited, the power supply system 22 brings each of the contactor unit 56 and the contactor unit 60 into the interruption state as shown in FIG. 7. Accordingly, it is possible to suppress the influence of the short circuit of the first power transmission path 52 on the other portions of the power supply circuit 24.

When the first power transmission path 52 is short-circuited, the contactor unit 48 is maintained in the conduction state. Therefore, each electric motor 44 is operated by the electric power supplied from the battery 30, and each electric motor 44 drives each VTOL rotor 18.

Thereafter, when the gas turbine 34 is restarted, the power supply system 22 brings the contactor unit 64 into the conduction state in a state in which each of the contactor unit 56 and the contactor unit 60 is brought into the interruption state as shown in FIG. 7. As a result, electric power is supplied from the battery 74 to the generator 36. The generator 36 is operated by the electric power supplied from the battery 74, and the generator 36 drives the gas turbine 34.

(Case where Electric Motor is Operated (2))

Figure 8:
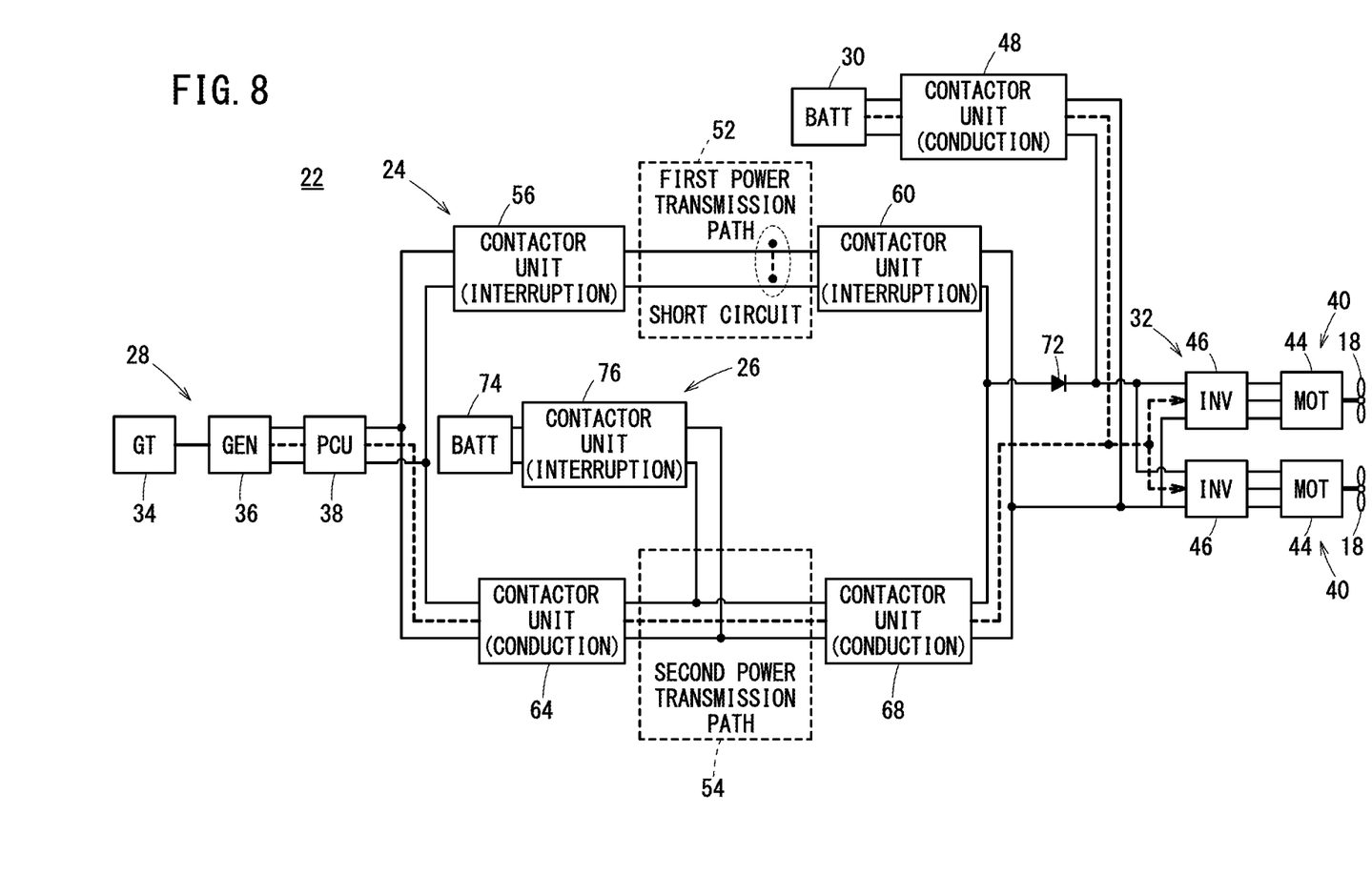
FIG. 8 is a schematic diagram of the power supply circuit.

When the electric motor 44 is operated in a state in which the first power transmission path 52 is short-circuited, the power supply system 22 brings each of the contactor unit 48, the contactor unit 64, and the contactor unit 68 into the conduction state as shown in FIG. 8. Further, the power supply system 22 brings each of the contactor unit 56, the contactor unit 60, and the contactor unit 76 into the interruption state.

As a result, electric power is supplied from the generator 36 to each electric motor 44 via the second power transmission path 54. Further, electric power is supplied from the battery 30 to each electric motor 44. Each electric motor 44 is operated by the electric power supplied from the generator 36 and the battery 30, and each electric motor 44 drives each VTOL rotor 18.

[Advantageous Effects]

Figure 9:
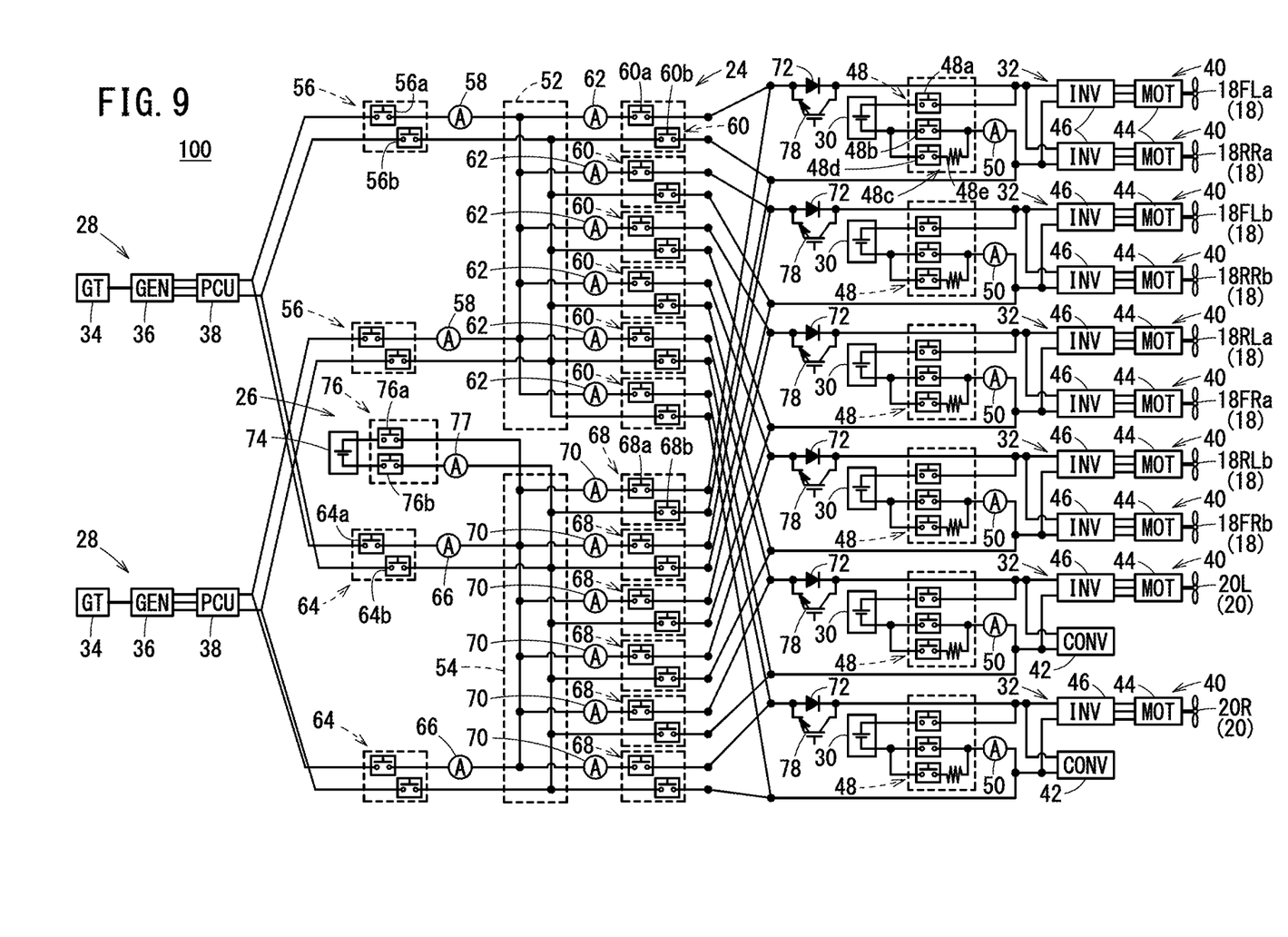
FIG. 9 is a diagram showing a configuration of a power supply system according to a comparative example.

FIG. 9 is a diagram showing a configuration of a power supply system 100 according to a comparative example. The power supply system 100 of the comparative example differs from the power supply system 22 of the present embodiment shown in FIG. 2 in the following points.

Firstly, in the power supply system 100 of the comparative example, a transistor 78 is provided in parallel with each diode 72. Secondly, in the power supply system 100 of the comparative example, each contactor unit 48 includes a precharge circuit 48c. The precharge circuit 48c is provided in parallel with the contactor 48b. The precharge circuit 48c includes a contactor 48d and a resistor 48e. Thirdly, in the power supply system 100 of the comparative example, the contactor unit 76 of the fault detection circuit 26 does not include the precharge circuit 76c.

When the capacitor of each PCU 38 is charged or when the gas turbine 34 is started, the power supply system 100 of the comparative example turns on the transistor 78. As a result, electric power is supplied from each battery 30 to each power generation unit 28 while bypassing the diode 72. In the power supply system 100 of the comparative example, the fault detection circuit 26 performs only voltage application to the second power transmission path 54 that is not in use.

In the power supply system 22 of the present embodiment, when the capacitor of each PCU 38 is charged or when the gas turbine 34 is started, electric power of the battery 74 of the fault detection circuit 26 is supplied to the power generation unit 28. In the power supply system 22 of the present embodiment, the fault detection circuit 26 also performs voltage application to the second power transmission path 54 that is not in use. As a result, in the power supply system 22 of the present embodiment, the transistor 78 provided in the power supply system 100 of the comparative example can be eliminated. Therefore, in the power supply system 22 of the present embodiment, the number of components constituting the power supply circuit 24 can be reduced. In addition, the reliability of the power supply system 22 can be improved.

Second Embodiment

Figure 10:
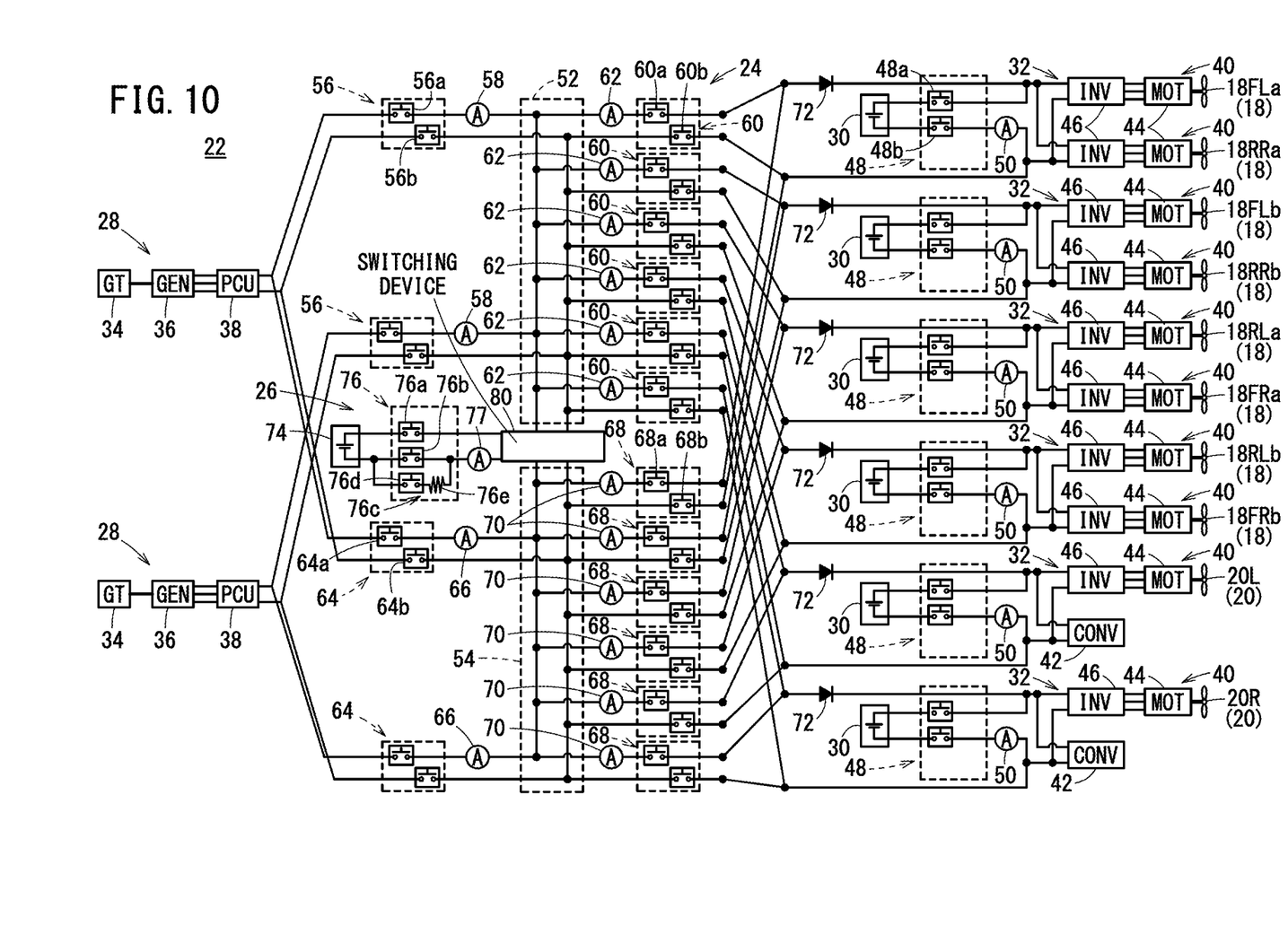
FIG. 10 is a schematic diagram showing the configuration of the power supply system.

FIG. 10 is a schematic diagram showing the configuration of the power supply system 22.

The fault detection circuit 26 of the present embodiment is connected to both the first power transmission path 52 and the second power transmission path 54. The fault detection circuit 26 includes a switching device 80. The switching device 80 switches between a state in which the fault detection circuit 26 applies a voltage to the first power transmission path 52 and a state in which the fault detection circuit 26 applies a voltage to the second power transmission path 54.

The power supply system 22 switches between a state in which electric power is supplied from each power generation unit 28 to each drive module 32 via the first power transmission path 52, and a state in which electric power is supplied from each power generation unit 28 to each drive module 32 via the second power transmission path 54. When the first power transmission path 52 is not in use, the power supply system 22 causes the switching device 80 to bring the fault detection circuit 26 into a state of applying a voltage to the first power transmission path 52. When the second power transmission path 54 is not in use, the power supply system 22 causes the switching device 80 to bring the fault detection circuit 26 into a state of applying a voltage to the second power transmission path 54.

[Advantageous Effects]

The power supply system 22 of the present embodiment includes the switching device 80 that switches between a state in which the fault detection circuit 26 applies a voltage to the first power transmission path 52 and a state in which the fault detection circuit 26 applies a voltage to the second power transmission path 54.

As a result, the single fault detection circuit 26 can detect a short circuit of the first power transmission path 52 when the first power transmission path 52 is not in use, and can detect a short circuit of the second power transmission path 54 when the second power transmission path 54 is not in use.

Third Embodiment

Figure 11:
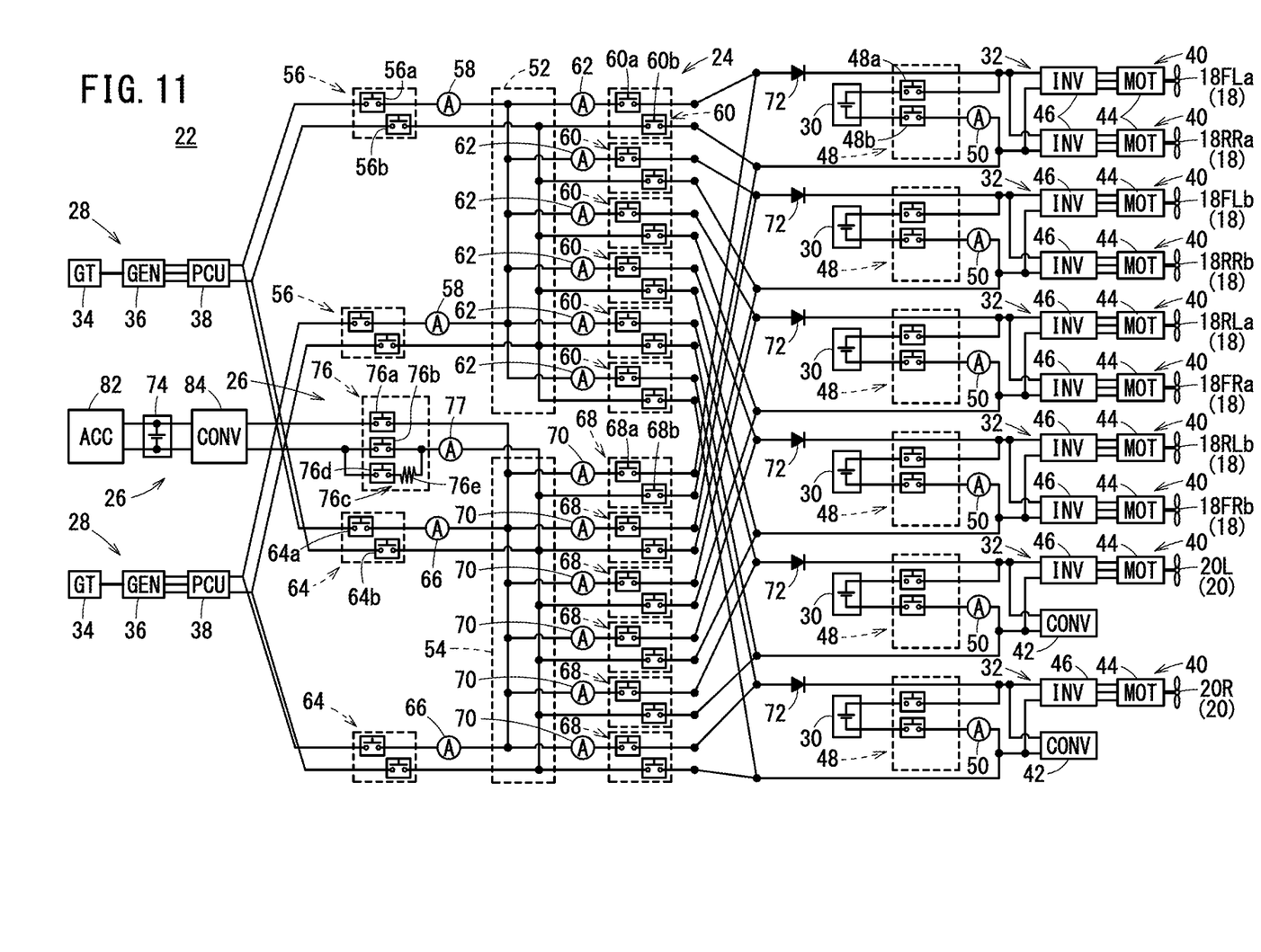
FIG. 11 is a schematic diagram showing the configuration of the power supply system.

FIG. 11 is a schematic diagram showing the configuration of the power supply system 22.

In the power supply system 22 of the present embodiment, a battery for supplying electric power to an accessory device 82 is used as the battery 74 of the fault detection circuit 26. A converter 84 is provided between the battery 74 and the contactor unit 76. The converter 84 boosts the voltage of the DC power supplied from the battery 74, and outputs the boosted power to the contactor unit 76.

The accessory device 82 is, for example, an air conditioner installed in the fuselage 12. The accessory device 82 is, for example, a refrigerator installed in the fuselage 12.

[Advantageous Effects]

In the power supply system 22 of the present embodiment, a battery for supplying electric power to the accessory device 82 is used as the battery 74 of the fault detection circuit 26. As a result, in the power supply system 22 of the present embodiment, the number of components constituting the fault detection circuit 26 can be reduced.

Note that the present invention is not limited to the above disclosure, and various modifications are possible without departing from the essence and gist of the present invention.

In the power supply system 22 of the first to third embodiments, electric power is supplied from each of the two power generation units 28 to each of the ten drive units 40. However, the number of the power generation units 28 may be one or more, and the number of the drive units 40 may be one or more.

Invention Obtained from Embodiments

The invention that can be grasped from the above embodiments will be described below.

The power supply system (22) of the aircraft (10) includes: the first power transmission path (52) configured to supply electric power from at least one power generation device (28) to at least one load device (40); the second power transmission path (54) configured to supply electric power from the at least one power generation device to the at least one load device; and the fault detection circuit (26) configured to apply a voltage to the second power transmission path, wherein when the electric power is supplied from the power generation device to the load device, the electric power is supplied from the power generation device to the load device via the first power transmission path, and a voltage is applied to the second power transmission path by the fault detection circuit in a state in which the power generation device and the load device are disconnected from the second power transmission path, and when the power generation device is started, electric power of the fault detection circuit is supplied to the power generation device in a state in which the power generation device is connected to the second power transmission path. According to this feature, the number of components can be reduced, and the reliability of the power supply system can be improved.

In the above-described power supply system of the aircraft, the fault detection circuit may include the switching device (80) configured to switch between a state in which a voltage is applied to the first power transmission path and a state in which a voltage is applied to the second power transmission path. According to this feature, the single fault detection circuit can detect a short circuit of the first power transmission path when the first power transmission path is not in use, and can detect a short circuit of the second power transmission path when the second power transmission path is not in use.

In the above-described power supply system of the aircraft, the power storage device (30) may be connected to the load device, and the power supply system may further include the diode (72) configured to allow electric power to be supplied from the first power transmission path and the second power transmission path to the power storage device, and to prevent electric power from being supplied from the power storage device to the first power transmission path and the second power transmission path. According to this feature, when the first power transmission path is short-circuited or when the second power transmission path is short-circuited, the electric power of the power storage device is prevented from flowing to the first power transmission path or the second power transmission path. As a result, electric power can be supplied from the power storage device to the load device even when the first power transmission path is short-circuited or when the second power transmission path is short-circuited.

In the above-described power supply system of the aircraft, the battery configured to supply electric power to the accessory device (82) installed in the fuselage (12) of the aircraft may be used as the battery of the fault detection circuit. According to this feature, the number of components constituting the fault detection circuit can be reduced.

The invention claimed is:

1. A power supply system of an aircraft, the power supply system comprising:
    a first power transmission path configured to supply electric power from at least one power generation device to at least one load device;
    a second power transmission path configured to supply electric power from the at least one power generation device to the at least one load device; and
    a fault detection circuit configured to apply a voltage to the second power transmission path,
    wherein when the electric power is supplied from the power generation device to the load device, the electric power is supplied from the power generation device to the load device via the first power transmission path, and a voltage is applied to the second power transmission path by the fault detection circuit in a state in which the power generation device and the load device are disconnected from the second power transmission path, and
    when the power generation device is started, electric power of the fault detection circuit is supplied to the power generation device in a state in which the power generation device is connected to the second power transmission path.

2. The power supply system of the aircraft according to claim 1, wherein
    the fault detection circuit includes a switching device configured to switch between a state in which a voltage is applied to the first power transmission path and a state in which a voltage is applied to the second power transmission path.

3. The power supply system of the aircraft according to claim 1, wherein
    a power storage device is connected to the load device, and
    the power supply system further comprises a diode configured to allow electric power to be supplied from the first power transmission path and the second power transmission path to the power storage device, and to prevent electric power from being supplied from the power storage device to the first power transmission path and the second power transmission path.

4. The power supply system of the aircraft according to claim 1, wherein
a battery configured to supply electric power to an accessory device installed in a fuselage of the aircraft is used as a battery of the fault detection circuit.

* * * * *